May 14, 1968 W. A. RAY 3,383,039
DOMESTIC OVEN ROAST PROBE CONTROL SYSTEM
Filed Dec. 22, 1965
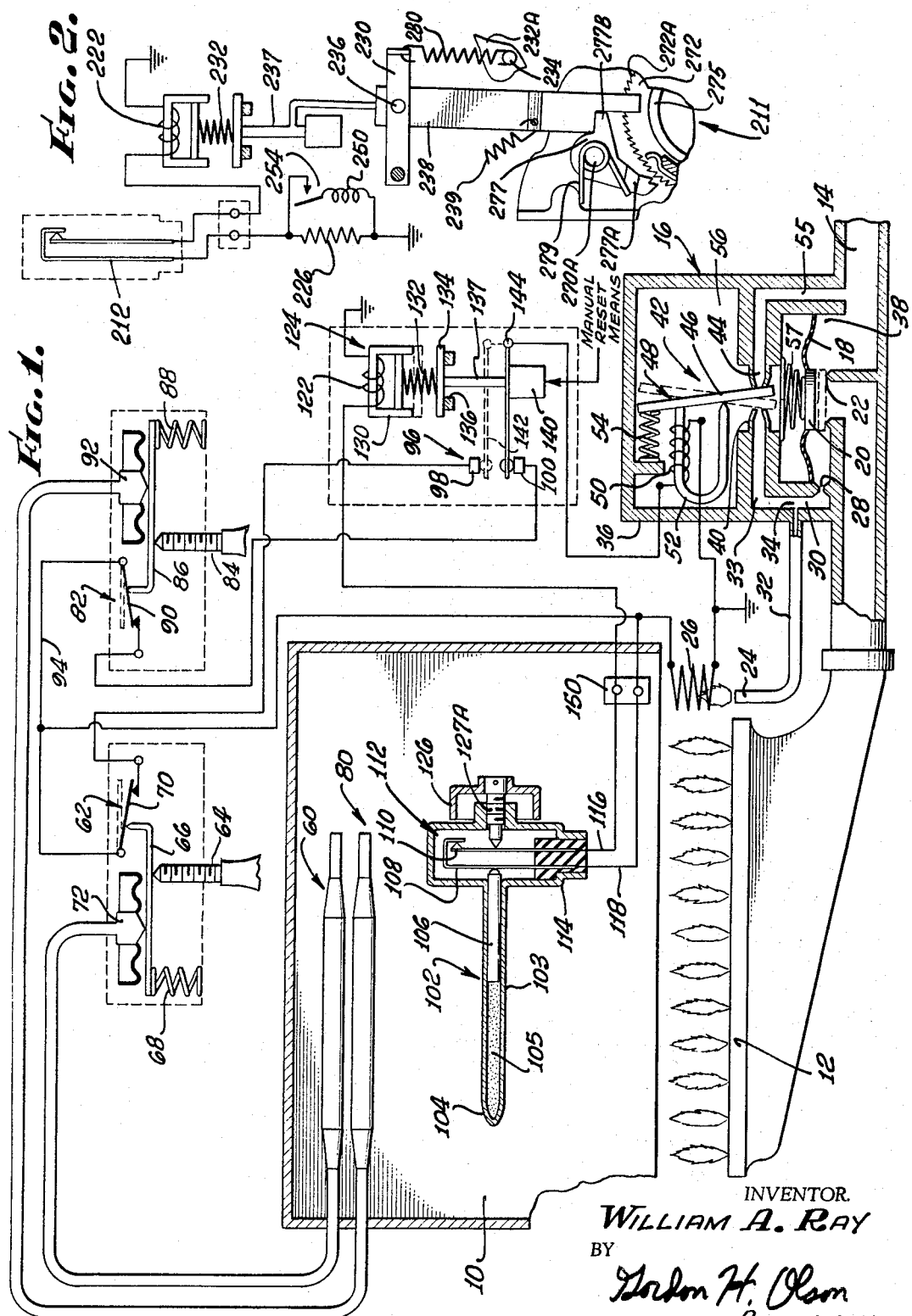
INVENTOR.
WILLIAM A. RAY
BY
Gordon H. Olson
ATTORNEY.

United States Patent Office 3,383,039
Patented May 14, 1968

3,383,039
DOMESTIC OVEN ROAST PROBE
CONTROL SYSTEM
William A. Ray, North Hollywood, Calif., assignor to
International Telephone and Telegraph Corporation,
New York, N.Y., a corporation of Delaware
Filed Dec. 22, 1965, Ser. No. 515,664
9 Claims. (Cl. 236—15)

ABSTRACT OF THE DISCLOSURE

An oven temperature control system, utilizing a pair of temperature sensing and control assemblies each capable of monitoring and controlling the temperature within the oven by controlling the main gas supply valve, provides a separate temperature sensitive adjustable probe for insertion into a roast to monitor the temperature inside the roast independently of the temperature inside the oven. Control of the main gas valve and burner is switched from one of the temperature sensing and control assemblies to the other by operation of the probe.

---

The present invention relates to means and techniques useful in domestic oven controls and involves generally two dual selectable temperature controls one of which is selected to effect temperature control upon manual resetting of an electromagnet which is energized through a normally closed switch of a roast probe, the other temperature control being automatically selected when the roast probe senses an elevated temperature and causes such switch to open and release the electromagnet.

Briefly, as described herein, there is provided a pair of manually settable thermostats each having a switch which is normally closed when the thermostats are set to a selected temperature to be sensed and opened, i.e., rendered non-conductive, when the associated thermostat senses the temperature to which the thermostat has been set. These switches each have one terminal thereof connected to a corresponding stationary contact of a single pole-double throw selecting switch of a manually settable relay having movable switch arm mechanically connected to the armature of an electromagnet. The electromagnet is energized through a normally closed roast probe switch, but manual force in addition to the magnetic force generated by the electromagnet is required to move such armature to its attracted or reset position where it remains latched solely by such magnetic force until the roast probe switch is opened, thereby allowing the armature to return to a non-reset condition and effecting transfer from one thermostat control to the other. The roast probe switch is connected in a series circuit with the electromagnet and a thermocouple generator heated by the oven pilot burner. The thermostat selected in accordance with the energized or deenergized condition of the electromagnet is connected in a series circuit with such pilot generator, such selecting switch and an electric diaphragm type valve to control the flow of gas to the main oven burner.

It is, therefore, a general object of the present invention to provide means and techniques for accomplishing the above indicated functions and results.

A specific object of the present invention is to provide an improved dual thermostat system.

Another specific object of the present invention is to provide an improved roast probe control system.

Another specific object of the present invention is to provide a roast probe control system which may be used to either switch one of two thermostats or to reset a single thermostat to a lower temperature setting.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 illustrates, partly in schematic form, a system embodying features of the present invention.

FIG. 2 illustrates a modified form of the present invention using a single thermostat.

In the drawings the oven 10 is heated by gas burning at the oven burner 12, the gas flow to such burner 12 being supplied from a gas inlet 14 and controlled by an electric diaphragm valve 16 having a diaphragm 18 with a movable valve element 20 thereon shown in "valve open" position, and cooperating with its annular valve seat 22, as shown in dash lines, when in a "valve closed" position. The pilot burner 24 serves to heat a thermocouple pilot generator 26 for developing a voltage and operating current to energize the electrical components connected thereto.

A constant supply of gas is supplied to pilot burner 24 from gas inlet 14 through a restricted opening 28, channel 30 and gas line 32, the channel 30 being in the form of two intersecting bore holes 33, 34 in valve casing 36 and the restricted opening 28 being a small apertured portion that communicates the valve inlet chamber 38 with channel 30.

This channel 30 terminates at a valve port 40 of a three-way valve 42 having a second aligned port 44 with such ports 40 and 44 being alternately closed by a movable flapper valve element 46 which may comprise the movable armature of an electromagnet 48 having a coil 50 wound on a stationary U-shaped core member 52, the lower leg of which is extended to provide a pivot for the armature 46, such armature 46 being normally urged by a coil compresssion spring 54 against port 40 (as shown in dash lines) to close it, but when coil 50 is energized, the force of spring 54 is overcome and the armature is pivoted to open port 40 and close port 44 shown in full lines.

The port 44 is in communication with the gas inlet chamber 38 through a channel 55 in casing 36.

Thus, when the coil 50 is deenergized, port 40 is closed and port 44 is open and gas inlet pressure is present in the upper diaphragm chamber 56, i.e. the gas pressure on opposite sides of diaphragm 18 is equalized, and diaphragm 18 then moves downwardly to close main gas supply valve 20, 22 either under its own resiliency or by the added resiliency of coil compression spring 57. When the coil 50 is then energized, port 44 is closed and port 40 is open in which case the residual gas in chamber 56 is vented through channel 30 and line 32 to the pilot burner 24 where it is burned, and the resulting differential pressure on opposite sides of diaphragm 18 causes it to move upwardly and open valve 20, 22 as shown.

A primary thermostat 60 is mounted in oven 10 to be responsive to the temperature therein, and this thermostat 60 which may be filled with a heat expansible fluid is used to operate its associated switch 62 from its normally closed condition when the thermostat is set to a selected temperature to be sensed to its open position (shown in dash lines) when the thermostat senses the selected predetermined elevated temperature. The temperature at which such switch operation occurs may be adjusted by screw adjustment of a manually operable screw 64 serving as a movable fulcrum for the lever 66, the latter having one end thereof normally urged upwardly by coil compression spring 68, its other end engageable with the movable switch element 70 and an intermediate portion of lever 66 being engaged by movable plunger 72, the plunger 72 being moved in response to oven temperature. As shown, movement of plunger 72 against the lever 66 will effect counterclockwise pivotal movement of lever 66 about screw 64 acting as a fulcrum. Such movement of lever 66 will cause opening of the switch 62 so as to interpose a discontinuity in the circuit which it controls. This assembly is hereinafter referred to as the first temperature sensing and control assembly.

Likewise, a secondary thermostat 80 is mounted in oven 10 to be responsive to the temperature therein, and this thermostat 80 is used to operate its associated switch 82 from its normally closed condition to its open position (shown in dash lines) when the thermostat 80 senses a predetermined elevated temperature. The temperature at which such switch operation occurs may be adjusted by manually operable screw 84 serving as a movable fulcrum for the lever 86 having one end thereof urged upwardly by coil compression spring 88, its other end engageable with the movable switch element 90 and an intermediate portion of lever 86 being engaged by a movable plunger 92, the plunger 92 being moved in response to oven temperature. As shown, movement of plunger 92 against lever 86 will effect clockwise pivotal movement of lever 86 about screw 84 as a fulcrum. Such movement of lever 86 will cause opening of the switch 82 so as to interpose a discontinuity in the circuit which it controls. This assembly is hereinafter referred to as the second temperature sensing and control assembly.

The movable contact elements 70, 90 of switches 62 and 82 are connected to a common conductor 94 connected to the ungrounded terminal of thermocouple 26, the stationary contacts of switches 62 and 82 being connected respectively to corresponding stationary contacts 98, 100 of a single pole-double throw transfer relay 96 having its movable arm connected to the ungrounded terminal of coil 50.

A roast probe 102 is of conventional constructoin and is illustrated as having a tubular portion 103 closed at its pointed end 104 for insertion of the probe in a roast or the like being cooked in the oven for sensing internal temperature of the comestible. A heat expansible material 105 is confined between the pointed end and a metal rod or plunger 106 which engages an intermediate portion of the cantilever supported leaf spring switch element 108 having its upper end curved to normally engage the other cantilever supported leaf spring switch contact element 110 to provide a normally closed switch 112. These switch elements 108, 110 are mounted in a base portion of housing 114 by, for example, potting compound and are each connected to individual leads 116, 118, the lead 116 being connected to the ungrounded terminal of coil 122 of an electromagnet structure 124 and the lead 118 being connected to the ungrounded terminal of pilot generator 26.

The probe switch 112 is opened when the probe senses a particular elevated temperature, this particular temperature being adjustable by adjusting the position of switch element 110. For this purpose an adjustment knob 126 with a screw 127a extending therefrom is threaded into casing 114 to engage an intermediate portion of element 110.

The electromagnetic structure 124 includes the coil 122 on the stationary U-shaped core member 130 with a coil compression spring 132 urging its armature 134 against the stationary stop 136, the armature 134 having a stem 137 thereon terminating in a convenient manually operable push button 140 for moving the armature against the action of spring 132 and also the leaf spring contact element 142 to a magnetically attracted and maintained position (shown in dash lines) in contact with core member 130, i.e. for manually resetting the structure.

It is noted that the leaf spring element 142, an element of the previously mentioned transfer relay 96, has one of its ends fixed at point 144 and engages the knob 140 so that when the structure 124 is manually reset switch element 142 moves from engagement with contact 100 as shown in full lines to engagement with contact 98 as shown in dash lines to correspondingly render thermostat 80 inoperative and render thermostat 60 operative for the control of oven temperature.

It will be observed from the above description that even though the coil 122 may be energized through the probe switch 112, insufficient magnetic force is produced across the gap between the core and armature to move the armature 134 from its released position; hence the necessity for the manual reset knob 140. Once reset, however, the magnetic attraction of the armature is sufficient to latch the armature to the core member 130. When switch 112 opens, the magnetic field decays rapidly and the armature is returned by the spring 132 to its released position, until another manual reset operation is initiated.

This arrangement allows one to select many modes of operation, some of which are now enumerated.

(1) *Defrost and cook.*—The primary thermostat 60 is set at defrosting temperature, and food will defrost for a time determined by probe 102, which serves as a timer, and automatically switch to preset cooking temperature under the control of thermostat 80 at the end of the selected defrost period. This automatic swtiching from thermostat 60 to thermostat 80 is accomplished by armature 134 and switch blade 142 being returned to the position shown in full lines from the "reset" position shown in dash lines.

(2) *Sear and cook.*—The primary thermostat 60 is set at searing temperature and the thermostat 80 is set at cooking temperature, and food will sear for the time selected by timer probe 102 and then automatically switch to cooking at the end of the sear period. When switch 112 opens to deenergize coil 122 and effect repositioning of the switch blade 142 into the position shown in full lines.

(3) *Delay and cook.*—The primary thermostat 60 is set at OFF position, i.e. the lowest temperature, and the secondary thermostat 80 is set at cooking temperature and cooking will be delayed for a time selected by timer probe 102 which then automatically initiates cooking at the end of the delay period.

(4) *Cook and hold warm.*—The primary thermostat 60 is set at cooking temperature, and secondary thermostat 80 is set at a hold-warm temperature, and food will cook for a time selected by timer probe 102 after which thermostat 80 is effective to maintain a hold-warm condition.

(5) *Manual Cooking.*—The primary thermostat 60 operates as a standard oven control. The secondary thermostat 80 is set at OFF position, i.e. the lowest temperature setting, if desired and the timer probe 102 is not set.

Thus, in operation of the system, it will be initially assumed that the secondary thermostat is set in its OFF position, i.e. switch 82 is open as shown in dash lines and structure 124 is in its released condition shown. In such condition, the oven is turned off by virtue of valve 18–22 being in its "closed" position as shown in dash lines, except for the constantly burning pilot burner 24. With the structure 124 still in its released condition, oven temperatures may be selected by adjustment of manually operable screw 84 which closes switch 82 and cooking or warming is accomplished indefinitely at such preset temperature under the control of thermostat 80, and this is so regardless of whether the probe 102 is being used, i.e. disconnected at the probe connector 150.

When using the probe 102, it is connected at connector 150 and inserted into the comestible in the oven to sense the internal temperature of the comestible. The structure 124 is manually reset, using knob 140 in which case oven temperature is now controlled by primary thermostat 60 which is assumed to be set for an elevated cooking temperature. Such cooking continues until the internal temperature of the comestible causes the probe switch 112 to open in which case the coil 122 is deenergized and the armature 134 released to transfer oven temperature control from the primary thermostat 60 to secondary thermostat 80 which may have been preadjusted to either its off setting, in which case switch 82 would be open, i.e., non-conducting, or a hold-warm setting as, for example, 170° F., in which case the switch 82 would be in a closed condition. Assuming the latter setting the oven continues to be heated for the lower temperature of 170° F. until the knob with attached screw 84 is manually adjusted to its OFF position.

While the system has been described in relation to two separate selectable thermostats 60 and 80, features of the present invention are obtained using a single thermostat of the character described in the copending patent application of LeRoy Newton, Ser. No. 348,507, filed Mar. 2, 1964, wherein is disclosed a manually adjustable thermostat which includes a torsion spring and a pawl and ratchet escapement mechanism, with the torsion spring being wound and stressed upon manual adjustment of the thermostat to an elevated cooking temperature and with means incorporated to effect release of the pawl and is subsequent engagement with the ratchet to automatically cause the thermostat, upon tripping of such pawl, to automatically restore the thermostat to a lower temperature setting of 170° F. A portion of such a thermostat mechanism is shown at 211 in FIG. 2 wherein torsional spring housing 272 having teeth 272A is manually rotated to a desired temperature setting. This rotation tensions torsional spring 275 and pawl 277 pivotally mounted on pin 270A is urged by spring 279 contacting lug 277A to engage teeth 272A to hold the thermostat housing at the set temperature. When pawl 277 is rotated clockwise by lever 238 under the urging of springs 232 and 239 to pivot the pawl so as to disengage teeth 272A, housing 272 is free to rotate to a lower temperature setting under the urging of tension spring 275.

The rotary position of housing 272 is utilized to adjust the opening position of switch 254 which is operated by a suitable temperature sensing device subjected to the oven temperature. The oven may in this fashion be operated at a first temperature for a period of time and then at a second lower temperature.

In the above referenced application, the pawl is tripped in response to a mechanical timer cam moving pin 236, but in accordance with the modification of the present invention shown in FIG. 2, the pin is mechanically coupled to the armature stem 237 (corresponding to stem 137 in FIG. 1) so as to effect operation of pawl 277. When armature stem has been manually reset to its upper position, pawl 277 engages teeth 272A to hold the housing at a set position indicating a first temperature setting. When probe switch 212 reaches its set temperature which determines the duration of time for the first temperature setting of mechanism 211, switch 212 opens and coil 222 is deenergized causing armature stem 237 to move downwardly to trip pawl 277. Thermostat switch 254 is then set to cycle at a lower temperature setting such as 170° F. until manually opened to terminate the heating operation.

In this modification, there is no longer need for the selector switch 96 since the switch 254 of the single thermostat is maintained in a series circuit with the thermocouple 226 and coil 250. Also, in this modification, the spring 132 may be omitted since return movement of armature 134 is assured by spring 280.

In each case, if desired, an indicator or flag may be attached to the armature rod 137 for indicating the condition of the structure 124 although the position of knob 140 itself may provide sufficient indication.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What I claim is:
1. An oven temperature control system comprising:
  (a) means for heating the oven including a main gas burner, a pilot burner, and a control circuit having a thermocouple generator associated with the pilot burner for developing a voltage and operating current in the control circuit applicable to control ignition of the main burner;
  (b) a first temperature sensing and control assembly including a first temperature responsive thermostat and a first switch in the control circuit in series with the thermocouple generator and actuable by the first thermostat at a preselected temperature to interrupt the control circuit;
  (c) a second temperature sensing and control assembly including a second temperature responsive thermostat and a second switch in the control circuit in parallel with said first switch and in series with the thermocouple generator and actuable by the second thermostat at a preselected temperature to interrupt the control circuit; and
  (d) transfer relay means operatively interposed in the control circuit and selectively operable in a first direction to make and break a circuit through said first and second switches, respectively, and operable in a second direction to make and break a circuit through said second and first switches, respectively, to correlate control of the main gas burner in point of time with a selected one of said first or second thermostats.

2. The combination according to claim 1, in which said first and second switches are each independently and selectively adjustable between positions correlated to minimum and maximum temperatures wherein said switches are in open circuit condition at said minimum temperature adjustment and in normally closed circuit condition until actuated into open circuit condition at said preselected temperature condition by the associated thermostat.

3. The combination according to claim 1, in which said transfer relay is manually actuable in said first direction to complete the control circuit through said first switch to effect control of the main gas burner with said first thermostat when said first switch is in a normally closed condition.

4. The combination according to claim 1, in which said transfer relay is actuable in said second direction by spring means to complete the control circuit through said second switch to effect control of the main gas burner with said second thermostat when said first switch is in a normally closed condition.

5. The combination according to claim 1, in which means are provided to releasably latch said transfer relay means in condition to maintain the control circuit through said first switch, release of the latch being effected concomitantly with opening actuation of said first switch by said first thermostat to interrupt the control circuit, said interruption of the control circuit through said first switch effecting actuation of the transfer relay to complete the control circuit through said second switch when said second switch is in a normally closed condition.

6. The combination according to claim 1, in which probe means are provided within the oven, said probe means including a latch circuit in parallel with said control circuit and operative to latch said transfer relay in a selected condition.

7. The combination according to claim 6, in which said probe means includes a normally closed latch switch in series with said latch circuit, and temperature responsive switch-actuator means operatively associated with the latch switch to open the latch switch to interrupt the latch circuit to release the latch and effect operation of the transfer relay to break the control circuit through the first switch and complete the control circuit through the second switch.

8. The combination according to claim 6, in which said transfer relay includes an electromagnetic circuit including a magnetizable core and an armature movable into or out of abutting relation with the core to make or break a magnetic circuit therebetween, and an electrically energizeable coil in series with said latch circuit and activated thereby to magnetize the core to latch the armature thereto when said transfer relay is actuated in said first direction to make a circuit through said first switch.

9. The combination according to claim 7, in which said probe means includes adjustment means selectively adjustable to preset the oven temperature at which said latch switch will be opened by said temperature responsive switch-actuator means to interrupt the latch circuit.

References Cited
UNITED STATES PATENTS

| | | | |
|---|---|---|---|
| 2,914,644 | 11/1959 | Holtkamp. | |
| 2,933,585 | 4/1960 | Holtkamp | 236—15 |
| 3,269,651 | 8/1966 | Willson | 236—15 |

EDWARD J. MICHAEL, *Primary Examiner.*